United States Patent
Rahman

(10) Patent No.: US 9,191,622 B2
(45) Date of Patent: Nov. 17, 2015

(54) SYSTEM FOR FAULT DETECTION IN AN INTERNET PROTOCOL TELEVISION COMMUNICATION SYSTEM

(75) Inventor: Moshiur Rahman, Marlboro, NJ (US)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 1538 days.

(21) Appl. No.: 11/873,453

(22) Filed: Oct. 17, 2007

(65) Prior Publication Data

US 2009/0106809 A1    Apr. 23, 2009

(51) Int. Cl.
*H04N 7/173*      (2011.01)
*H04N 17/00*      (2006.01)
*H04N 21/24*      (2011.01)
*H04N 21/472*     (2011.01)

(52) U.S. Cl.
CPC ............ *H04N 7/173* (2013.01); *H04N 17/004* (2013.01); *H04N 21/2402* (2013.01); *H04N 21/2404* (2013.01); *H04N 21/47202* (2013.01)

(58) Field of Classification Search
CPC ............ H04N 5/4401; H04N 7/17309; H04N 7/17318; H04N 5/50; H04N 7/17354; H04N 5/23206; H04N 1/00244; H04N 7/181; H04N 2201/0084; G01S 13/878; H04B 7/2621; H04L 5/02
USPC .................. 725/107–108, 118, 105, 123; 348/180–181, 192, 62
See application file for complete search history.

(56) References Cited

U.S. PATENT DOCUMENTS

| | | | | |
|---|---|---|---|---|
| 6,064,440 A * | 5/2000 | Born et al. | .................... | 348/478 |
| 6,671,883 B1 * | 12/2003 | Rahman | ........................ | 725/123 |
| 7,356,348 B2 * | 4/2008 | Bifano et al. | ............... | 455/552.1 |
| 2006/0250967 A1 * | 11/2006 | Miller et al. | .................. | 370/241 |
| 2007/0036325 A1 | 2/2007 | Khoshaba et al. | | |
| 2007/0083788 A1 * | 4/2007 | Johnson et al. | .................... | 714/1 |
| 2007/0162931 A1 | 7/2007 | Mickle et al. | | |
| 2007/0174726 A1 * | 7/2007 | Nam et al. | ....................... | 714/43 |
| 2008/0066130 A1 * | 3/2008 | Elbarky | ........................ | 725/110 |

FOREIGN PATENT DOCUMENTS

EP       1562390 A1     10/2005
WO     2007062419 A2     5/2007

* cited by examiner

*Primary Examiner* — Ngoc Vu
(74) *Attorney, Agent, or Firm* — Guntin & Gust, PLC; Jay H. Anderson

(57) ABSTRACT

A system that incorporates teachings of the present disclosure may include, for example, an Internet Protocol Television (IPTV) network element can have a wireless transceiver, a wireline transceiver, and a controller. The controller can be adapted to process multimedia signals received from an upstream IPTV network element, transmit the processed multimedia signals to one or more downstream IPTV network elements, monitor communications on a wireline interface capable of accessing a fault management system (FMS), and cause the wireless access transceiver to wirelessly transmit to the FMS telemetry information collected responsive to detecting one or more faults in the wireline interface. The controller can also cause the wireline transceiver to transmit to the FMS over the wireline interface the telemetry information responsive to detecting no fault in the wireline interface that impedes communication with the FMS over the wireline interface. Other embodiments are disclosed.

22 Claims, 3 Drawing Sheets

SYSTEM FOR FAULT DETECTION IN AN INTERNET PROTOCOL TELEVISION COMMUNICATION SYSTEM

FIELD OF THE DISCLOSURE

The present disclosure relates generally to communication services and more specifically to a system for fault detection in an Internet Protocol Television (IPTV) communication system.

BACKGROUND

A typical Internet Protocol Television (IPTV) communication network broadcasts multimedia services to consumer using a multicast communication method. The IPTV network can also provide consumers interactive communication services such as video on demand utilizing a unicast communication method.

To provide these services, an IPTV network employs a number of complex network elements to distribute broadcast services. Typical IPTV network elements can include for example a super headend office system, a video headend office system, a core network of routers, and a central office that connects to service area interface systems that supply the multimedia services to commercial establishments and residences. To maintain and manage a complex IPTV infrastructure, a reliable fault management system is needed.

DETAILED DESCRIPTION

In one embodiment of the present disclosure, an Internet Protocol Television (IPTV) network element operating in an IPTV communication system can have a wireless transceiver, a wireline transceiver, and a controller. The controller can be adapted to process multimedia signals received from an upstream IPTV network element, transmit the processed multimedia signals to one or more downstream IPTV network elements, monitor communications on a wireline interface capable of accessing a fault management system (FMS), and cause the wireless access transceiver to wirelessly transmit to the FMS telemetry information collected responsive to detecting one or more faults in the wireline interface that impede communication with the FMS over the wireline interface. The controller can also cause the wireline transceiver to transmit to the FMS over the wireline interface the telemetry information responsive to detecting no fault in the wireline interface that impedes communication with the FMS over the wireline interface.

In one embodiment of the present disclosure, a computer-readable storage medium operating in an Internet Protocol Television (IPTV) network element can have computer instructions for distributing multimedia signals received from an upstream IPTV network element, monitoring communications on a wireline interface capable of accessing a fault management system (FMS), wirelessly transmitting to the FMS telemetry information collected by the IPTV network element responsive to detecting one or more faults in the wireline interface that impede communication with the FMS over the wireline interface, or transmitting to the FMS over the wireline interface the telemetry information responsive to detecting no fault in the wireline interface that impedes communication with the FMS over the wireline interface.

In one embodiment of the present disclosure, a fault management system (FMS) operating in an IPTV communication system can have a controller to monitor communications on a wireline interface for accessing at least one IPTV network element, process telemetry information received from the at least one IPTV network element over a wireless interface responsive to detecting one or more faults in the wireline interface that impede communication with the at least one IPTV network element over the wireline interface, and process telemetry information received from at least one IPTV network element over the wireline interface responsive to detecting no fault in the wireline interface that impedes communication with the FMS over the wireline interface.

Figure 1:
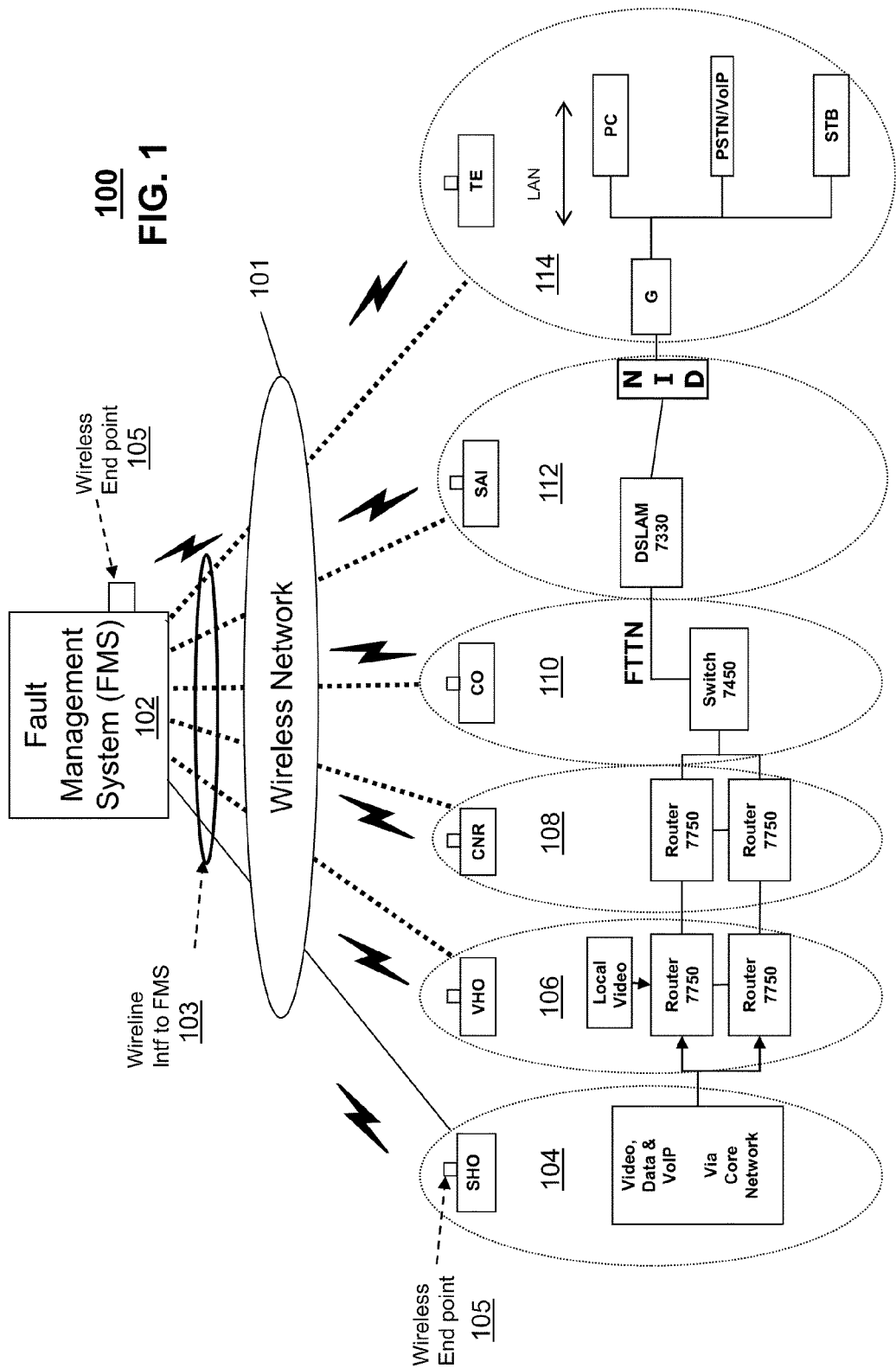
FIG. 1 depicts an exemplary embodiment of a communication system.

FIG. 1 depicts an exemplary embodiment of a communication system 100 employing an IPTV broadcast media architecture. In a typical IPTV infrastructure, there is at least one super headend office server (SHO) 104 which receives national media programs from satellite and/or media servers from service providers of multimedia broadcast channels. The SHO 104 forwards IP packets associated with the media content to video headend offices (VHOs) 106 which distribute media content to central offices (COs) 110 by way of a core network of routers (CNR) 108 using a multicast communication method. The COs 110 can utilize common switching equipment to distribute multimedia signals to service area interface systems (SAIs) 112. The SAIs 112 in turn can utilize digital subscriber line access multiplexers which couple to network interface devices (NID) at a terminating endpoint (TE) 114 in order to supply IPTV services to consumers situations in residences and/or commercial establishments.

The terminating endpoint can house a gateway (e.g., a residential gateway or RG) that couples to the NID. The gateway distributes broadcast signals to media receivers such as Set-Top Boxes (STBs), and/or other computing devices for presenting multimedia services such as IPTV video and audio programming, and Internet services. Unicast traffic can be exchanged between the media receivers and subsystems of communication system 100 for services such as video-on-demand (VoD), instant messaging, email, or other suitable forms of Internet traffic. Although not shown, the IPTV network elements 104-112 can be operably coupled to or integrated with an IP Multimedia Subsystem (IMS) network that provides voice services to public switch telephone network (PSTN) terminals and VoIP terminals located at the TE 114.

Communication system 100 can also comprise a fault management system (FMS) 102 that monitors and assists field technicians in maintaining IPTV network elements shown by illustration as references 104-114. In the present context a network element can represent in whole or in part any subsystem illustrated in FIG. 1. The FMS 102 can monitor the IPTV network elements 104-114 by a wireline interface 103 to the SHO 104 which is daisy-chained to the other IPTV network elements 106-112. In this embodiment, however, when an IPTV network element fails downstream IPTV network elements can lose communications with the FMS 102 although they have experience no operational fault. To overcome this, the FMS 102 can be coupled with independent wirelines 103 to the other IPTV network elements 106-114. This latter embodiment, however, can be costly, and for some IPTV service operators, it may not be a feasible option due to limited budgets and resources.

The FMS 102 and each of the IPTV network elements 104-114 can also include a wireless endpoint 105 that utilizes for example a common wireless transceiver to communicate therebetween by way of a wireless network 101. The wireless network 101 and the wireless end points 105 can operate according to any number of long-range wireless access technologies including without limitation a Worldwide Interoperability for Microwave Access (WiMAX) protocol, a cellular protocol (GPRS, EVDO, EDGE, UMTS, etc.), an ultra-wideband protocol, or a software defined radio protocol in which the wireless access protocol can be changed and/or upgraded dynamically.

Figure 2:
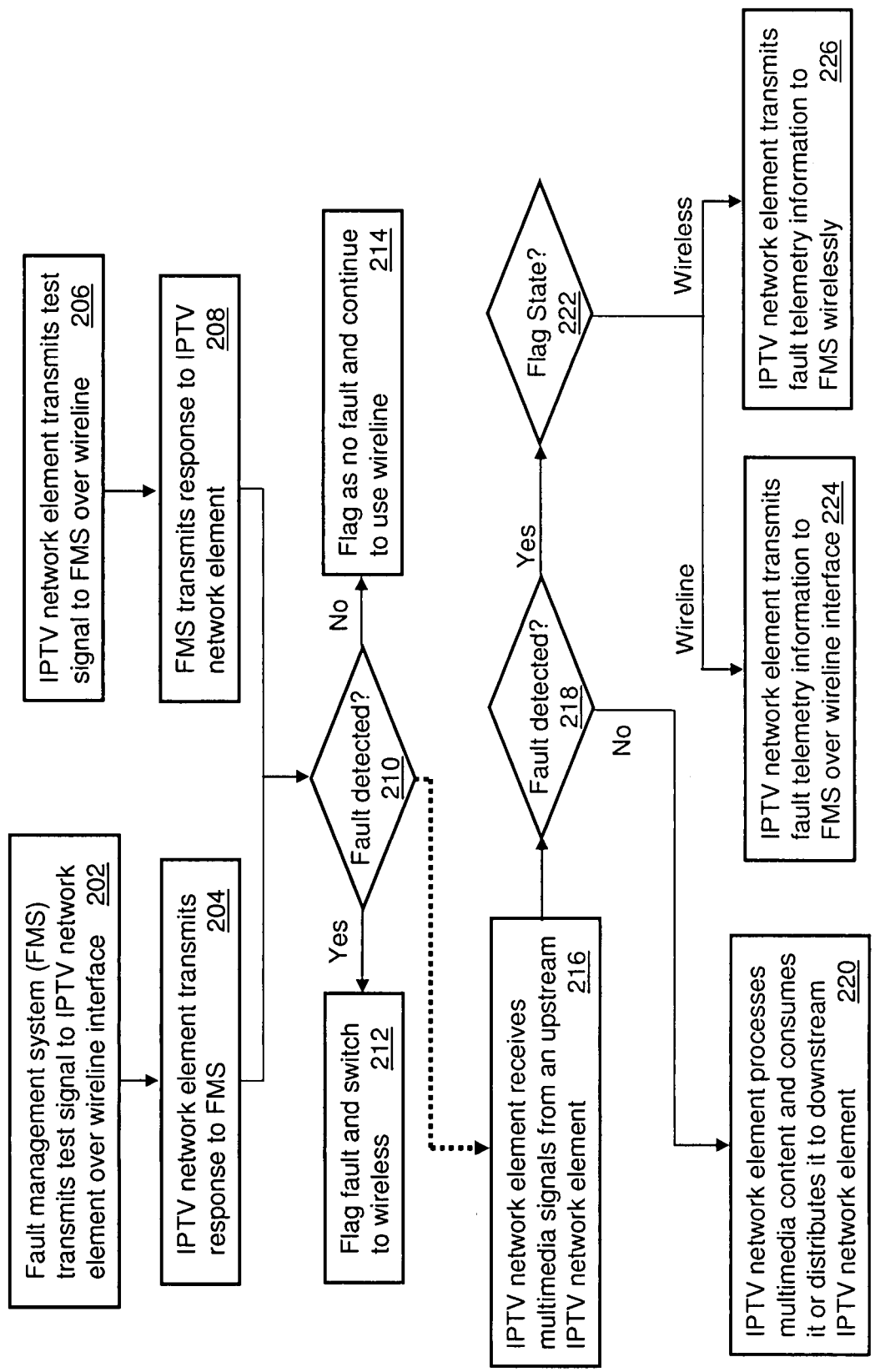
FIG. 2 depicts exemplary method operating in portions of the communication system.

FIG. 2 depicts an exemplary method 200 operating in portions of the communication system 100. In one embodiment, method 200 can begin with step 202 in which the FMS 102 transmits test signals (e.g., test packets) to a select IPTV network element (assume for example the VHO 106) over the wireline interface. In step 204, the VHO 106 can transmit response packets to the FMS 102 to facilitate monitoring of faults on the wireline interface. The response packets transmitted by the VHO 106 can be transmitted over the wireline interface 103 or by way of the wireless network 101 using the wireless endpoints 105. The test packets transmitted by the FMS 102 can be of any suitable quantity, size and/or content (e.g., pseudo random test patterns, heartbeat or keep alive messages, etc.) for testing the integrity of the wireline interface 103 and the operational integrity of the receiving IPTV network element. The packet responses from the VHO 106 can include information that indicates the integrity of the packets received (e.g., bit error rate, packet loss, packet sequence gaps, etc.) along with a message that indicates that VHO successfully received the test packets from the FMS 102.

In another embodiment, an IPTV network element can in step 206 proactively initiate testing on the wireline interface 103 by transmitting test packets to the FMS 102 in a manner similar to what was described for step 202. In step 208, the FMS 102 can transmit by way of the wireline interface 103 or the wireless network 101 response packets (as described above) that provide the IPTV network element an indication of the state of communications with the FMS 102 by way of the wireline interface 103.

Steps 202 through 208 as described can be invoked on a periodic basis (e.g., once per hour). Accordingly, if either the FMS 102 and an IPTV network element fails to detect in step 210 an expected test cycle initiated by either the FMS or the IPTV network element as described by steps 202-208, or detects faults in the wireline interface 103, the FMS and the IPTV network element can proceed to step 212 where they assert a flag that registers a fault and thereby prompts them to switch to wireless communications over the wireless network 101 for conveying telemetry information. Otherwise, if no faults are detected, the FMS 102 and IPTV network element assert in step 214 a flag indicating a no-fault condition and continue to use the wireline interface 103 to communicate telemetry information therebetween. Steps 202-214 can operate as background processes in the FMS 102 and IPTV network elements respectively.

Steps 216-226 describe a process for delivering multimedia services to residences and commercial establishments and for communicating to the FMS 102 telemetry information associated with each of the IPTV network elements 104-114. With this in mind, an IPTV network element (e.g., a VHO 106) receives in step 216 multimedia signals from an upstream IPTV network element (e.g., an SHO 104). The receiving IPTV network element can test in step 218 for faults in its own system as well as faults in the multimedia signals received. Internal faults can include loss of power, malfunctioning network cards, or other similar hardware and software faults. Faults in the multimedia signals can include signal distortions such as excessive packet loss, packet sequence gaps, jitter, latency, or other distortions which may impact the multimedia services provided to the TEs 114.

If a fault is detected in step 218, the IPTV network element proceeds to step 222 wherein it checks a state of communications between itself and the FMS 102. If the wireline interface 103 was previously detected as inoperable or malfunctioning, the IPTV network element transmits in step 226 telemetry information associated with the detected faults in step 218 over the wireless network 101. Otherwise, the IPTV network element proceeds to step 224 where it transmits the telemetry information to the FMS 102 over the wireline interface 103 as it would under normal operating conditions.

Referring back to step 218, if no substantial faults are detected, the IPTV network element proceeds to step 220 where it processes the multimedia content and consumes it (if it is the TE 114), or distributes it to a downstream IPTV network element which performs steps 216-226 as just described.

Upon reviewing the aforementioned embodiments, it would be evident to an artisan with ordinary skill in the art that said embodiments can be modified, reduced, or enhanced without departing from the scope and spirit of the claims described below. For example, method 300 can be adapted so that the FMS 102 and/or the IPTV network element periodically test the wireline interface 103 to detect a restoration of service. When service is restored, the FMS 102 and IPTV network element can reset their respective flags and continue providing telemetry information over the wireline interface 103. Method 300 can also be adapted to transmit fault notices to service agents of communication system 100 to attend to faults as soon as they arise.

These are but a few examples of modifications that can be applied to the present disclosure without departing from the scope of the claims. Accordingly, the reader is directed to the claims section for a fuller understanding of the breadth and scope of the present disclosure.

Figure 3:
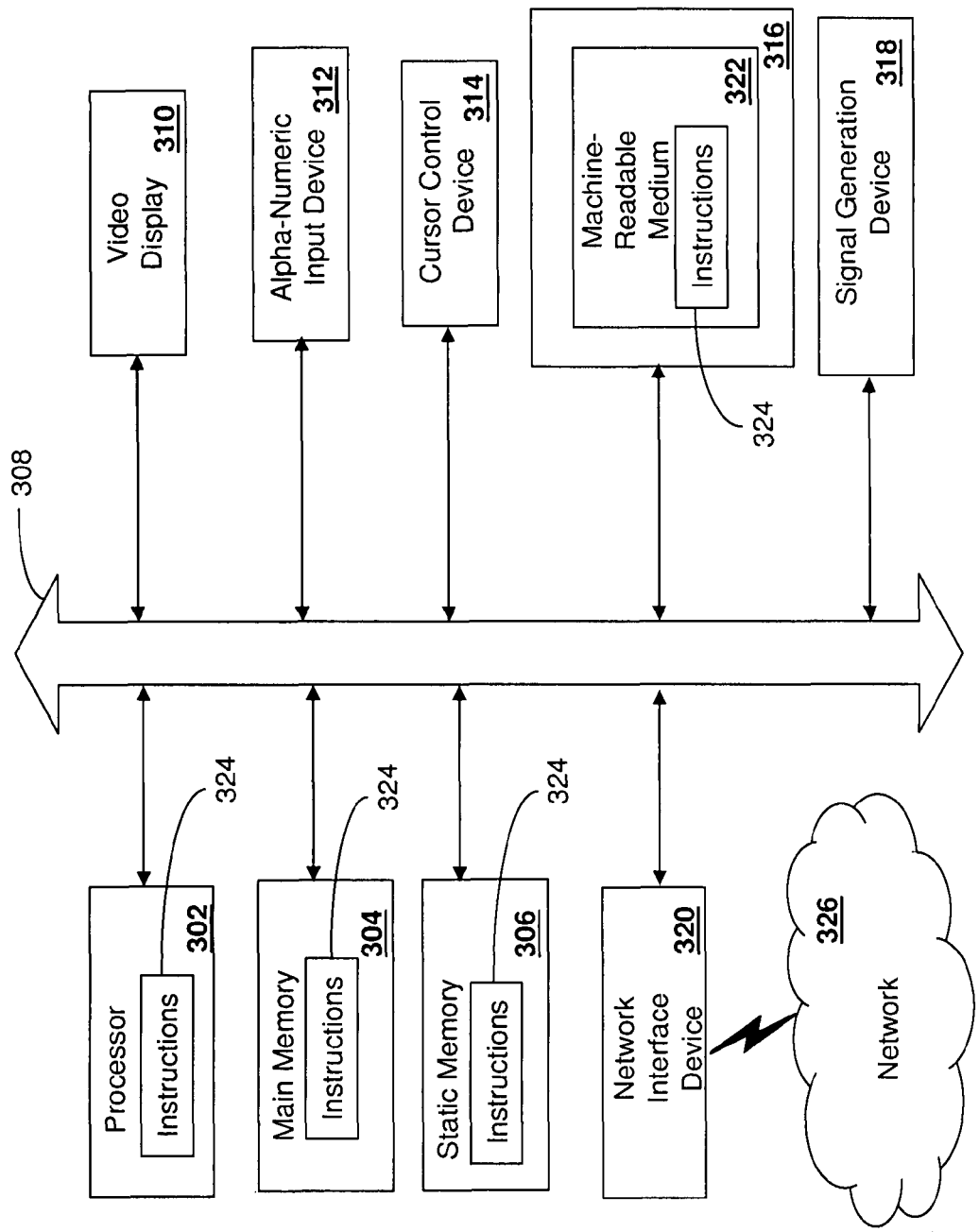
FIG. 3 is a diagrammatic representation of a machine in the form of a computer system within which a set of instructions, when executed, may cause the machine to perform any one or more of the methodologies discussed herein.

FIG. 3 depicts an exemplary diagrammatic representation of a machine in the form of a computer system 300 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU, or both), a main memory 304 and a static memory 306, which communicate with each other via a bus 308. The computer system 300 may further include a video display unit 310 (e.g., a liquid crystal display (LCD), a flat panel, a solid state display, or a cathode ray tube (CRT)). The computer system 300 may include an input device 312 (e.g., a keyboard), a cursor control device 314 (e.g., a mouse), a disk drive unit 316, a signal generation device 318 (e.g., a speaker or remote control) and a network interface device 320.

The disk drive unit 316 may include a machine-readable medium 322 on which is stored one or more sets of instructions (e.g., software 324) embodying any one or more of the methodologies or functions described herein, including those methods illustrated above. The instructions 324 may also reside, completely or at least partially, within the main memory 304, the static memory 306, and/or within the processor 302 during execution thereof by the computer system 300. The main memory 304 and the processor 302 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 324, or that which receives and executes instructions 324 from a propagated signal so that a device connected to a network environment 326 can send or receive voice, video or data, and to communicate over the network 326 using the instructions 324. The instructions 324 may further be transmitted or received over a network 326 via the network interface device 320.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to email or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An interactive television network element operating in an interactive television communication system, the interactive television network element corresponding to a headend element of a plurality of connected interactive television network elements, the network element comprising:
   a first wireless transceiver;
   a wireline interface for accessing a fault management system;
   a wireline transceiver;
   a memory to store instructions; and
   a controller coupled to the memory, wherein responsive to executing the instructions, the controller performs operations comprising:
      processing multimedia signals received from a media service provider to generate processed multimedia signals;
      transmitting the processed multimedia signals to another network element corresponding to a downstream interactive television network element of the plurality of connected interactive television network elements, the downstream element located downstream from the headend element;
      monitoring communications on the wireline interface, wherein the monitoring includes monitoring for a first message of a periodic test cycle to the interactive television network element from the fault management system via the wireline interface, wherein the periodic test cycle comprises the first message and a second message, responsive to the first message, from the interactive television network element to the fault management system, wherein the downstream element comprises a second wireless transceiver for accessing the fault management system, wherein the downstream element communicates with the wireline interface only via the headend element, and wherein the fault management system monitors the downstream element via the wireline interface;
      monitoring for internal faults in the interactive television network element;
      monitoring for faults in the wireline interface;
      monitoring for faults in the multimedia signals;
      registering a fault condition in accordance with:
         failing to detect the first message of the periodic test cycle,
         detecting an internal fault in the interactive television network element,
         detecting a fault in the wireline interface by testing components of the interactive television network element, or
         detecting a fault in the multimedia signals;
      causing the first wireless transceiver to wirelessly transmit to the fault management system telemetry information collected responsive to the fault condition; and
      causing the wireline transceiver to transmit to the fault management system over the wireline interface the telemetry information responsive to detecting no fault in the wireline interface that impedes communication with the fault management system over the wireline interface,
      wherein the downstream element transmits to the fault management system telemetry information associated with an internal fault of the downstream element or a fault in the processed multimedia signal, the telemetry information transmitted via the second wireless transceiver in case of a previous detection of a fault in the wireline interface.

2. The interactive television network element of claim 1, wherein the first wireless transceiver corresponds to a long-range wireless access transceiver, wherein the telemetry information includes packet sequence gaps, wherein the monitoring for the faults in the multimedia signals comprises monitoring for jitter in the multimedia signals, and wherein the operations further comprise monitoring for a service restoration associated with the fault condition.

3. The interactive television network element of claim 2, wherein the long-range wireless access transceiver corresponds to a worldwide interoperability for microwave access transceiver.

4. The interactive television network element of claim 1, wherein the first message comprises a test packet from the fault management system over the wireline interface to monitor faults on the wireline interface.

5. The interactive television network element of claim 1, wherein the operations further comprise:
   transmitting a test signal to the fault management system over the wireline interface; and
   receiving a response signal from the fault management system to monitor faults on the wireline interface.

6. The interactive television network element of claim 5, wherein the receiving further comprises receiving the response signal by way of a wireless access transceiver.

7. The interactive television network element of claim 5, wherein the receiving further comprises receiving the response signal by way of the wireline interface.

8. The interactive television network element of claim 1, wherein the interactive television network element corresponds to a super headend office server.

9. A tangible computer-readable storage device having instructions embedded therein, which, responsive to being executed by a processor of a headend network element operating in an interactive television communication system, cause the processor to perform operations comprising:
   distributing multimedia signals received from a media service provider;
   monitoring communications on a wireline interface for accessing a fault management system, wherein the monitoring includes monitoring for a first message of a periodic test cycle to the headend network element from the fault management system via the wireline interface, wherein the periodic test cycle comprises the first message and a second message, responsive to the first message, from the headend network element to the fault management system, wherein the headend network element comprises a first wireless transceiver, wherein the television communication system comprises the headend network element and a downstream network element receiving the distributed multimedia signals, wherein the downstream network element communicates with the wireline interface only via the headend network element, and wherein the downstream network element comprises a second wireless transceiver for accessing the fault management system;
   detecting a fault based on an analysis of the multimedia signals;
   monitoring for internal faults in the headend network element;
   monitoring for faults in the wireline interface;
   wirelessly transmitting to the fault management system, by the first wireless transceiver, telemetry information collected by the headend network element responsive to failing to detect the first message of the periodic test cycle from the fault management system; and transmitting to the fault management system over the wireline interface the telemetry information responsive to detecting no fault in the wireline interface that impedes communication with the fault management system over the wireline interface, wherein the downstream network element transmits to the fault management system telemetry information associated with an internal fault of the downstream network element or a fault in the distributed multimedia signals, the telemetry information transmitted via the second wireless transceiver in case of a previous detection of a fault in the wireline interface.

10. The tangible computer-readable storage device of claim 9, wherein the operations further comprise wirelessly transmitting the telemetry information according to a worldwide interoperability for microwave access protocol.

11. The tangible computer-readable storage device of claim 9, wherein the first message comprises a test packet from the fault management system over the wireline interface to monitor faults on the wireline interface.

12. The tangible computer-readable storage device of claim 9, wherein the operations further comprise: transmitting a test signal to the fault management system over the wireline interface; and receiving a response signal from the fault management system to monitor faults on the wireline interface.

13. The tangible computer-readable storage device of claim 12, wherein the receiving further comprises wirelessly receiving the response signal.

14. The tangible computer-readable storage device of claim 12, wherein the receiving further comprises receiving the response signal by way of the wireline interface.

15. The tangible computer-readable storage device of claim 9, wherein the headend network element corresponds to a super headend office server, and the downstream network element comprises a core network router.

16. A fault management system operating in an interactive television communication system, comprising:
a memory to store instructions; and
a controller coupled with the memory, wherein the controller, responsive to executing the instructions, performs operations comprising:
monitoring communications on a wireline interface for accessing a headend network element operating in the interactive television communication system, wherein the headend network element comprises a first wireless interface and is coupled to a downstream network element operating in the interactive television communication system and comprising a second wireless interface;
monitoring the downstream network element via the wireline interface, wherein the downstream network element communicates with the wireline interface only via the headend network element;

processing telemetry information received from the headend network element over the first wireless interface,
responsive to detecting a fault in the wireline interface that impedes communication with the headend network element over the wireline interface or
responsive to detecting a failure by the controller to detect an expected response message of a periodic test cycle from the wireline interface of the headend network element, wherein the periodic test cycle comprises an initial message from the fault management system to the headend network element and the response message,
wherein the detecting of the fault in the wireline interface is based on testing internal components of the headend network element and testing for faults in multimedia signals received by the headend network element, wherein the multimedia signals are distributed to the downstream network element; and
processing telemetry information received from the headend network element over the wireline interface responsive to detecting no fault in the wireline interface that impedes communication with the fault management system over the wireline interface,
wherein the downstream network element transmits to the fault management system telemetry information associated with an internal fault of the downstream network element or a fault in the distributed multimedia signals, the telemetry information transmitted via the second wireless interface in case of a previous detection of a fault in the wireline interface.

17. The fault management system of claim 16, wherein the controller wirelessly receives telemetry information from the headend network element according to a software defined radio protocol.

18. The fault management system of claim 16, wherein the operations further comprise receiving a test signal from the headend network element over the wireline interface to monitor faults on the wireline interface.

19. The fault management system of claim 16, wherein the operations further comprise transmitting a test packet to the headend network element over the wireline interface; and receiving a response packet from the headend network element to monitor faults on the wireline interface.

20. The fault management system of claim 19, wherein the controller wirelessly receives the response packet.

21. The fault management system of claim 19, wherein the controller receives the response packet by way of the wireline interface.

22. The fault management system of claim 16, wherein the downstream network element corresponds to a terminating endpoint device.

* * * * *